United States Patent [19]

Kent

[11] Patent Number: 5,532,632
[45] Date of Patent: Jul. 2, 1996

[54] METHOD AND CIRCUIT FOR SYNCHRONIZING AN INPUT DATA STREAM WITH A SAMPLE CLOCK

[75] Inventor: Bruce C. Kent, Long Beach, Calif.

[73] Assignee: Hughes Aircraft Company, Los Angeles, Calif.

[21] Appl. No.: 189,826

[22] Filed: Feb. 1, 1994

[51] Int. Cl.[6] .................................................. H03L 7/00
[52] U.S. Cl. ......................... 327/141; 327/160; 327/261; 327/265
[58] Field of Search ........................ 327/141, 155, 327/160, 161, 261, 263, 265; 375/106, 118, 119

[56] References Cited

U.S. PATENT DOCUMENTS

| | | | |
|---|---|---|---|
| 3,851,101 | 11/1974 | En et al. ................................ | 375/119 |
| 4,700,347 | 10/1987 | Rettberg et al. .......................... | 371/1 |
| 4,821,296 | 4/1989 | Cordell .................................. | 375/119 |
| 4,841,551 | 6/1989 | Avaneas ................................. | 375/118 |
| 5,022,056 | 6/1991 | Henderson et al. ...................... | 375/119 |
| 5,022,057 | 6/1991 | Nishi et al. ............................. | 375/119 |
| 5,034,967 | 7/1991 | Cox et al. ............................... | 375/119 |
| 5,278,873 | 1/1994 | Lowrey et al. .......................... | 375/118 |

*Primary Examiner*—Timothy P. Callahan
*Assistant Examiner*—Jeffrey Zweizig
*Attorney, Agent, or Firm*—Phyllis Y. Price; Terje Gudmestad; Wanda Denson-Low

[57] ABSTRACT

A method and circuit for synchronizing input data with a sample clock in which, for each sample clock cycle, the position of input data transitions relative to an acceptable neutral zone is detected. The neutral zone is of predetermined time duration and is positioned in a predetermined location relative to the active edge of the clock signal. If the transition occurs during the neutral zone no corrective action is warranted. If the data transitions move beyond the neutral zone, into a predetermined time interval on either side of the active edge, this event is captured and used by control logic to effect a return of the data transitions to a location within the neutral zone.

7 Claims, 4 Drawing Sheets

METHOD AND CIRCUIT FOR SYNCHRONIZING AN INPUT DATA STREAM WITH A SAMPLE CLOCK

TECHNICAL FIELD

This invention relates to a method of and circuits for synchronizing an input data stream with a sample clock and more particularly to a method and circuit in which the transition time in the input data stream is adjusted relative to the active edge of a sample clock in order to maintain the transition occurrences within an acceptable transition zone.

BACKGROUND ART

Very Large Scale Integrated (VLSI) circuit design practices dictate that data input timing with respect to the sample clock be accurately predicted and/or measured. If the predicted or measured data delay approaches the sample clock period, the sample clock must be carefully tuned to achieve valid timing with respect to the data input. Such tuning methods are labor intensive. The coax or delay lines used to adjust delays add size and weight to finished products. Moreover, tuning can not be done until parts have been integrated at a high level. If predicted or measured data delay variations exceed the sample clock period (reduced by set-up and hold times, and margin), either the interface can not be realized or the interface must be re-designed by slowing down the data rate by ½ and doubling the number of data wires. This adds complexity, size, power and cost to the finished product.

SUMMARY OF THE INVENTION

In view of the above, it is an object of the present invention to provide a synchronizing circuit that meets input data timing requirements without resort to system clock tuning.

It is another object of the present invention to provide a method and synchronizing circuit that enables error-free operation in the presence of data delay variations which exceed the capabilities of standard input tuned circuits.

It is another object of the present invention to provide a synchronizing circuit that eliminates the need to specify input data set-up and hold times.

In accordance with the present invention, a synchronizing circuit is provided which includes an input terminal for connection with a source of data and an output terminal providing an output data stream. A clock input is connected with a clock source of predetermined frequency. The circuit includes a time delay control which introduces fixed and variable time delays between the input and output data stream. The circuit includes control logic for establishing a neutral zone which represents a time interval, relative to the active edge of the clock signal, during which data transitions are acceptable. The delay introduced by the variable time delay is dependent on the state of an up/down counter which dictates the length of the variable time delay. As long as the data transitions occur during the neutral zone, the state of the counter and thus the time delay introduced by the variable delay is not changed. If data transitions occur outside the neutral zone, the control logic detects the violation and increments the counter either up or down to increase or decrease the variable delay time by a predetermined incremental amount. In either case the data transition is moved back to within the neutral zone.

BRIEF DESCRIPTION OF THE DRAWINGS

A more complete understanding of the present invention may be had from the following detailed description that should be read with the drawings in which.

DETAILED DESCRIPTION OF PREFERRED EMBODIMENT

Figure 1:
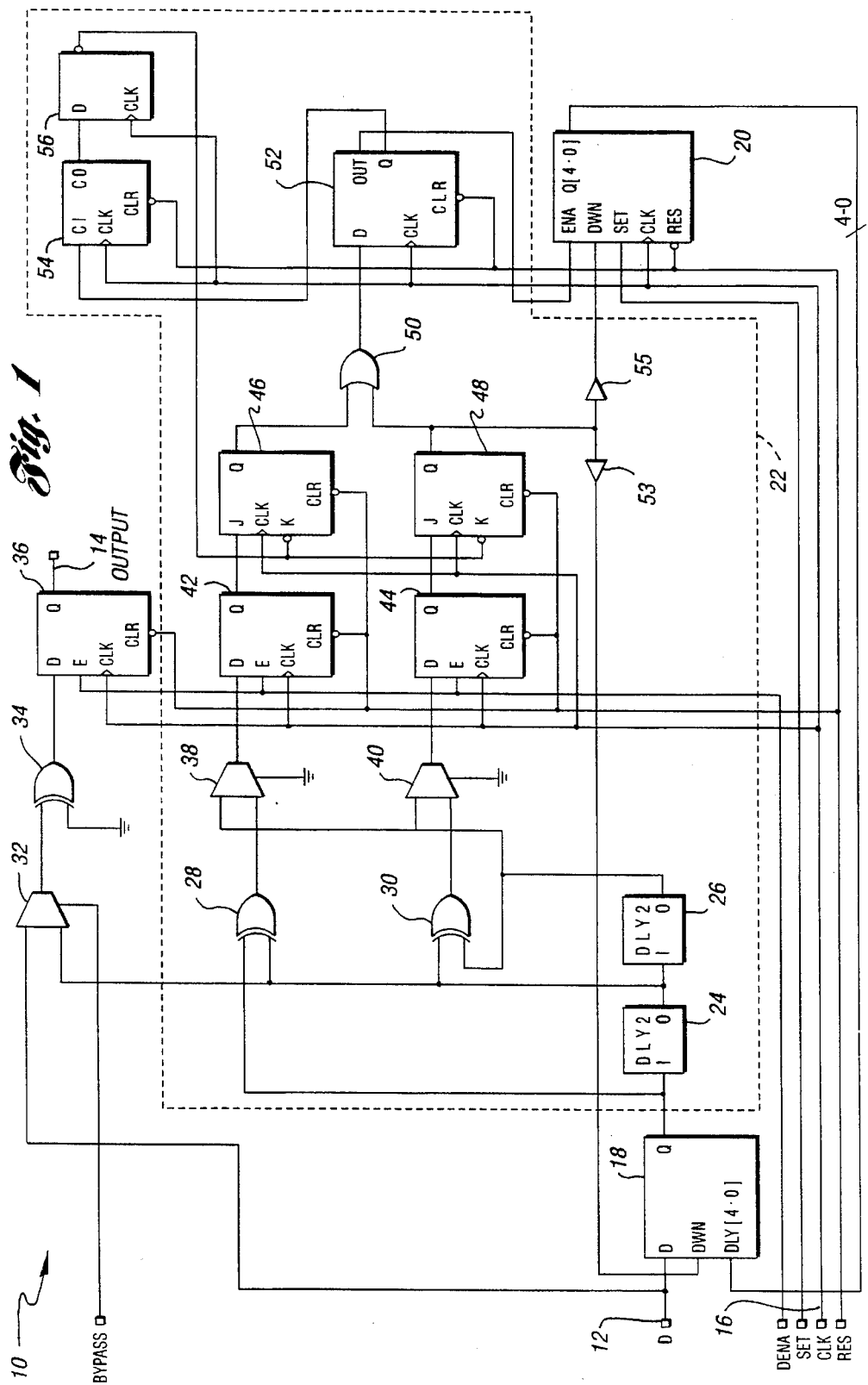
FIG. 1 is a logic diagram of the preferred embodiment of the invention.

Referring now to the drawings and initially to FIG. 1, the synchronizing circuit of the present invention is generally designated 10 and comprises an input terminal 12 for connection with a source of data D and an output terminal 14 providing an output data stream. A clock input terminal 16 is to be connected with a clock source CLK of predetermined frequency. The circuit 10 includes a variable or vernier time delay element 18 connected with the input terminal 12 for delaying the input data stream applied thereto. The element 18 provides an adjustable or programmable delay function, thereby producing at its Q output a data stream having transitions which are adjustable in time relative to the input data stream at its D input. The delay introduced by the time delay element 18 is dependent on the state of an up/down counter 20. The counter 20 is incremented in either an up or down direction by control logic generally designated 22.

The logic 22 establishes a neutral zone or time interval during which transitions of the output data stream are considered acceptable. As long as the data transitions occur during the neutral zone the state of the counter 20 and thus the time delay introduced by the element 18 is not changed from its existing delay time. If data transitions occur outside the neutral zone, or within the predetermined time interval on either side of the active or rising edge R of the clock signal CLK, the control 22 increments the counter 20 either up or down to increase or decrease the vernier delay time by a predetermined incremental amount. In either case the data transition is moved back to within the neutral zone.

The logic 22 includes fixed delay elements 24 and 26 serially connected with the Q output of the vernier delay element 18. The element 24 is connected across the inputs of an exclusive OR gate 28. The element 26 is connected across the inputs of an exclusive OR gate 30. The output of the element 24 provides one input to a multiplexer 32, the other input of which receives the input data stream at the terminal 12. The input selected by the multiplexer 32 is determined by an input designated BYPASS. The output of the multiplexer 32 is fed through an exclusive OR gate 34 to the D input of a data flip flop 36. The flip flop 36 produces the output stream under the control of the clock input CLK. The BYPASS control, when activated, bypasses the vernier 18 and the circuit behaves like a standard clocked input. The gate 34 is included merely to balance the delay introduced by the gates 28 and 30 in the control logic 22. Similarly, the logic 22 includes multiplexers 38 and 40 which present the outputs of the gates 28 and 30 to the D inputs of flip flops 42 and 44. The multiplexers 38 and 40 have their Select inputs grounded and merely provide a delay balance to the multiplexer 32. The Q outputs of the flip-flops 42 and 44 are connected to the J inputs of J-K flip-flops 46 and 48 respectively. The Q outputs of the flip-flops 46 and 48 provide inputs to an OR gate 50, the output of which provides the input to a one-shot multivibrator 52 which is triggered from CLK. The one-shot 52 enables the counter 20, as well as a reset delay counter 54. The Q output of the flip-flop 48 is also connected with the direction input (DWN) of the vernier 18 and the counter 20, through non-inverting buffers 53 and 55 respectively, to set the up or down counting mode.

The counter 54 is a standard four bit binary counter and controls the K inputs of the JK flip-flops 46 and 48 through a D-type flip flop 56. The counter 54 determines the reset delay (approximately sixteen clock cycles) from the time that the counter 20 is enabled to the time that the JK-flip-flops 46 and 48 are cleared. This delay allows time for the new delay value established by the vernier 18 to take effect.

Figure 2:
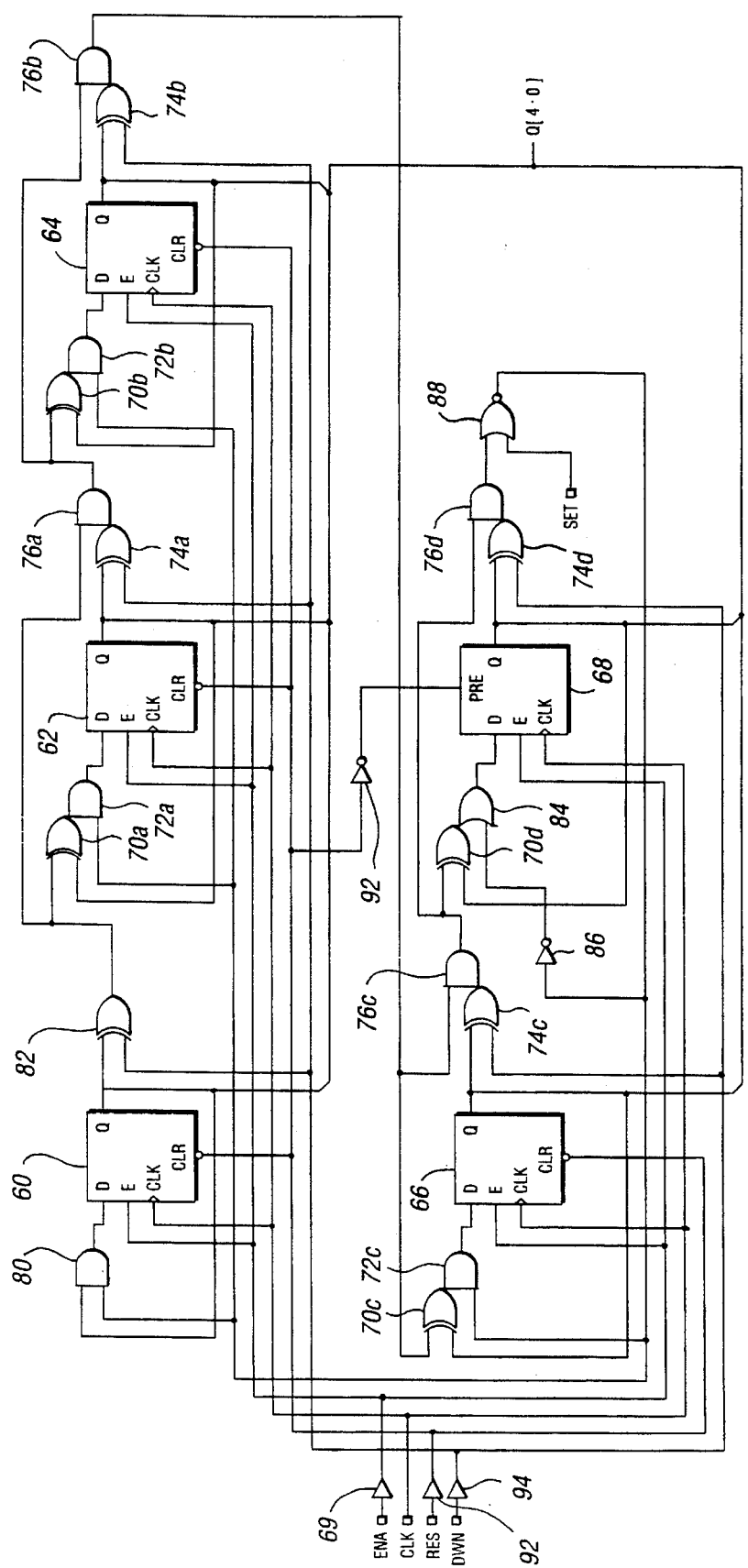
FIG. 2 is a logic diagram of the variable time delay control counter.

The counter 20 is a five-bit up/down binary counter, and is shown in detail in FIG. 2. Each stage of the counter 20 includes a D type flip-flop 60, 62, 64, 66, and 68 which provide at their Q outputs the 5 bit digital word which controls the delay time of the variable delay 18. Each of the flip-flops is enabled from the ENA input through a non-inverting buffer 69. The second, third and fourth stages, comprising flip-flops 62, 64 and 66, each include exclusive OR gates 70a–70c, AND gates 72a–72c, exclusive OR gates 74a–74c and AND gates 76a–76c. The least significant stage, containing the flip-flop 60, includes an AND gate 80 and an exclusive OR gate 82. The most significant stage, containing the flip-flop 68, includes exclusive OR gates 70d and 74d, AND gate 76d, and an OR gate 84 and inverter 86. The most significant stage also includes a NOR gate 88 and inverter 92. The counter includes synchronous and asynchronous resets which force its state to "10000" (msb→lsb). This places the vernier 18 near the midpoint of its delay range, maximizing its ± delay tracking capability. The synchronous reset is provided connecting the CLR inputs of the flip-flops 60–66 through the non-inverting buffer 90 with the reset input designated RES and by connecting the preset input PRE of the flip-flop 68 with RES through the inverter 92. It is intended that the circuit 10 be reset whenever the particular input it is receiving is not being used, thus allowing the circuit 10 to start from its midpoint when the source is later used. If the data is always used, the reset function may not be required. The counter direction is controlled by the DWN input to the XOR gates 74a–74d, and 82 through the non-inverting buffer 94. The counter 20 has an additional non-standard feature which results from the inclusion of the OR gate 84 and inverter 86 at the input to the most significant flip-flop 68. If the counter state is "11111" and the counter is enabled to count up, the counter state goes to "10000" instead of "00000". Similarly, if the counter state is "00000" and the counter is enabled to count down, the counter state goes to "10000" instead of "11111". This behavior avoids the possibility of "riding" the delay discontinuity which exists when changing the vernier controls between "11111" and "00000". If it is known that the maximum delay variation will never put the counter in this state, these counter modes may be eliminated. As a function of required delay compensation range and the unit delay step, the number of bits in the counter 20 and the vernier 18 may be made larger or smaller.

Figure 3:
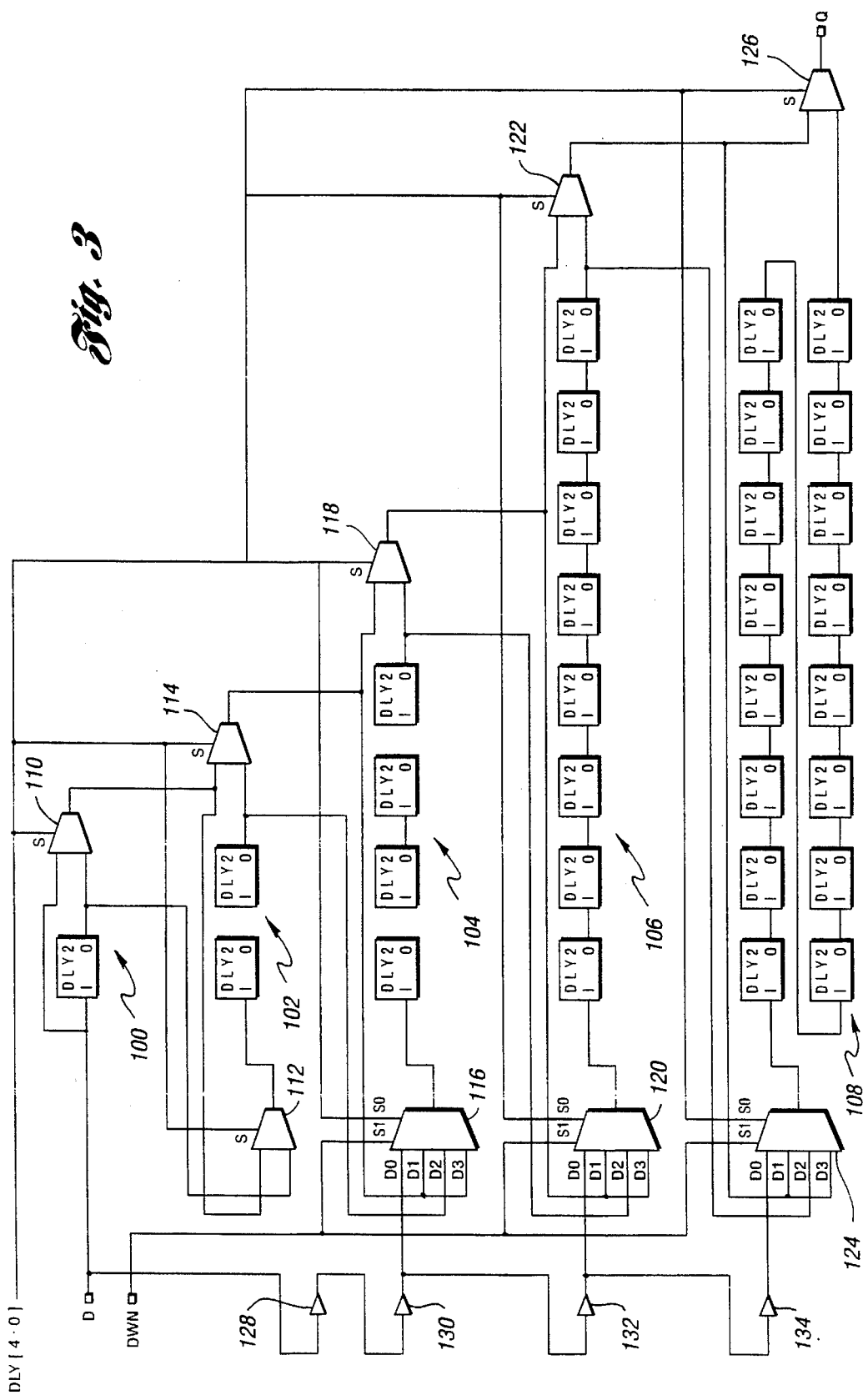
FIG. 3 is a logic diagram of the variable time delay circuit.

Referring to FIG. 3, the programmable delay function of the vernier 18 is implemented by non-inverting buffer strings generally designated 100, 102, 104, 106, and 108 and multiplexers 110, 112, 114, 116, 118, 120, 122, 124, and 126.

The buffers 100–108 are arranged in five delay strings, comprising unit delay elements, to produce relative delays of 1, 2, 4, 8 and 16 delay units respectively. The multiplexers are controlled at their Select inputs by outputs of the delay counter 20. The multiplexers combine the buffer strings to realize delays from 0 to 31 delay units. The multiplexers 116, 120 and 124 have a second select input responsive to the direction input DWN. The data input is applied to the D0 input multiplexer 116 through non-verting buffers 128 and 130, to the D0 input of multiplexer 120 through the buffers 128, 130 and 132 and to the D0 input of the multiplexer 124 through the buffers 128, 130, 132, and 134. Select S0 selects either the D0 or D1 when S1 is 0 and selects either D2 or D3 when S1 is 1. The multiplexers 116, 120 and 124 are included to ensure continuity of the output data signal as delay controls are changed. Otherwise the output data would experience a momentary discontinuity or drop-out equivalent to eight delay units when switching from a delay control of "10000" to "01111". If this discontinuity is acceptable, the corresponding multiplexers and up/down control may be eliminated.

Figure 4:
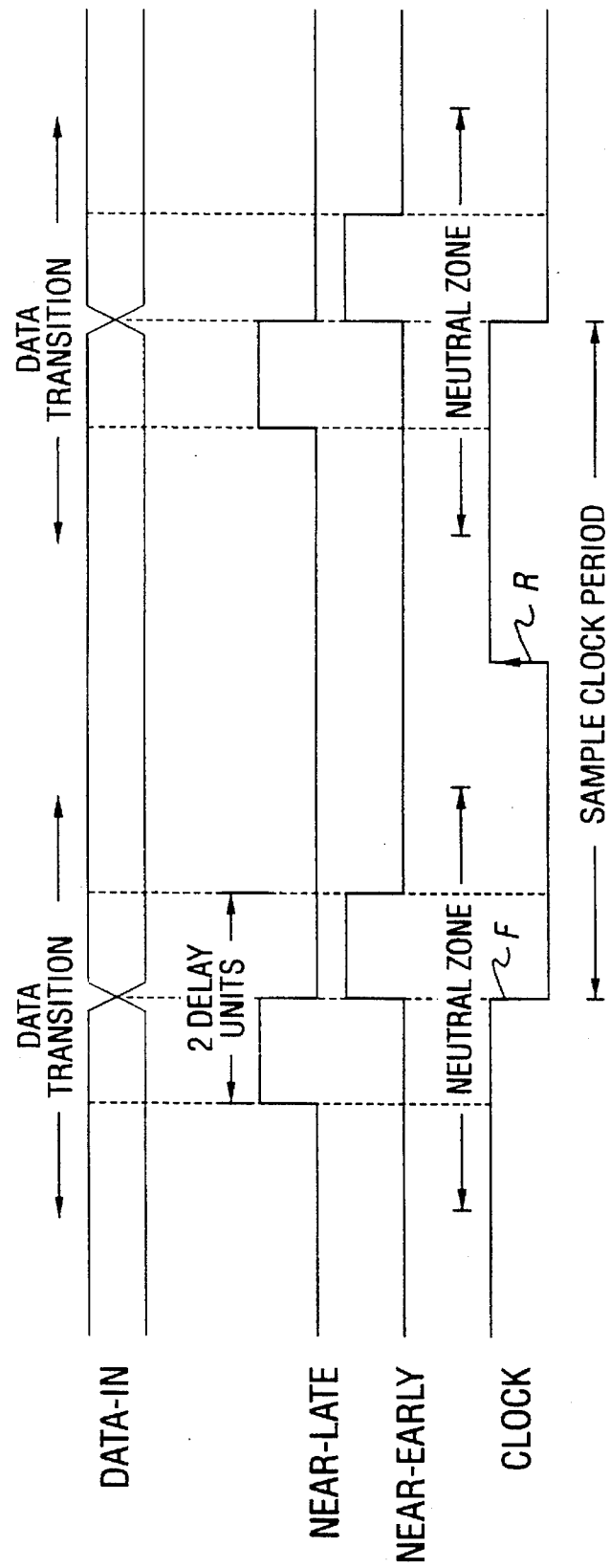
FIG. 4 is a timing diagram useful in describing the operation of the invention.

Referring now to FIG. 4, an ideal timing diagram for the circuit of FIG. 1 is shown. Ideally, data transitions in the input data bit stream occur far away from the clock signal rising edge, coincident with the clock signal falling edge for example. The fixed unit delay 24 and the XOR gate 28 produce the waveform designated NEAR-LATE at the input to the flip-flop 42. The fixed delay 26 and the XOR gate 30 produce the waveform designated NEAR-EARLY at the input of the flip-flop 44. Assuming data is received at the sample clock rate, data-enable (DENA) is always HIGH, enabling the flip-flops 36, 42, and 44. Every sample clock cycle, the state of the early and late XOR gates 28 and 30 are sampled by the flip-flops 42 and 44, respectively. If the data transition occurs within the neutral zone, as shown, neither the early nor the late XOR gate output is HIGH during the sample clock active or rising edge and no adjustment of the data transition time is required. Over time, the data timing may increase or decrease with respect to the sample clock due to variations in temperature, voltage, radiation, and other causes. As the data transitions move with respect to the sample clock active edge, the NEAR-EARLY and NEAR-LATE pulses also move. If the data delay varies to the point that a data transition occurs within one delay unit of the sample clock rising edge, either the input to the flip-flop 42 or 44 will be high during the sample clock active edge. This condition is captured by the appropriate flip-flop. Assuming data timing decreases and a near-late condition is detected, the JK-flip-flop 46 is set and the delay counter 20 counts up one, increasing the data delay by one-delay unit. Assuming data timing increases and a near-early condition is detected, the JK-flip-flop 48 is set and the delay counter 20 counts down one, decreasing the data delay by one-delay unit. In either case, the data transition is moved to the neutral zone, away from potential set-up or hold time violations at the input of the data flip-flop 36. After a sufficient time to allow the new delay to become valid, as determined by the counter 54, the JK flip-flops 46 and 48 are cleared and the process continues.

It is not critical that the vernier delay unit 18 be precisely controlled or that the total vernier delay be perfectly linear with respect to the control inputs, thus allowing the circuit to be implemented using standard parts. The delay should be monotonic (always increasing or decreasing) with respect to its controls.

The realization of the vernier delay strings may differ from case to case as a function of the technology and timing involved. The circuit of the present invention uses buffer strings. A different design may implement the different strings as five single buffers driving different loads with relative loading of 1, 2, 4, 8 and 16. The circuit as shown includes a data enable input (DENA) which enables the data and flip-flops. If, in a particular implementation, data is always sampled every clock cycle, the DENA control can be eliminated. The target value for the vernier delay unit is a function of several variables. The maximum vernier delay unit step plus the maximum delays across the XOR gates 28 and 30 must be less than the sample clock period. Delays must be determined as a function of processing, temperature, voltage, and other delay variables. If this condition is not met, the circuit may never be able to place the data transition in the neutral zone and the circuit may toggle indefinitely between near-early and near-late conditions. Assuming that the delay units across the XORs 28 and 30 are equivalent to the vernier delay unit, the maximum delay unit should be less than one-third the sample clock period. Given the maximum delay unit value from above, the designer can, as a function of the technology being used, and operating conditions, predict the minimum delay unit value. The minimum delay value times ½ the number of vernier or delay counter steps must be greater than the expected plus or minus data delay variation. If the data delay variation exceeds the capabilities of the vernier or delay counter, the data stream will be corrupted during the transition from "00000" or "11111" to "10000". In addition, the minimum delay unit defines the minimum set-up or hold time that will be maintained at the data flip-flop and similarly, the maximum data input jitter which can be tolerated.

While the forms of the invention herein disclosed are presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A synchronizing circuit comprising a data input means for receiving an input data stream, sample clock input means for receiving a sample clock signal of predetermined frequency establishing a predetermined sample clock period, and a data output means providing a synchronized output data stream, said circuit comprising:

variable time delay means responsive to said input data stream for providing a delayed data stream having data transitions which are adjustable relative to the data transitions occurring in said input data stream;

means responsive to said delayed data stream for providing said synchronized output data stream;

logic means for detecting the occurrence of data transitions within a predetermined time interval on either side of the active edge of said clock signal;

means for adjusting the delay interval of said variable time delay means, in response to data transitions within said predetermined time interval, to either increase or decrease said delay interval to thereby return the data transitions of said output data stream to a neutral zone outside said predetermined time interval; and wherein said logic means includes means for defining said neutral zone comprising first and second fixed delay means serially connected with said variable time delay means and first and second exclusive OR gates connected across said first and second fixed delay means.

2. The circuit defined in claim 1 wherein said logic means further includes means for capturing and storing the output of said first and second exclusive OR gates.

3. The circuit defined in claim 2 wherein said adjusting means is a binary up/down counter whose counting direction is dependent on the state of said storing means and which normally sets said variable time delay means to the midpoint of its delay range.

4. The circuit defined in claim 1 wherein said adjusting means is a binary up/down counter which normally sets said variable time delay means to the midpoint of its delay range and said up/down counter being enabled to count up and thereby change said variable delay in one direction in response to detection of a data transition on one side of said neutral zone, said up/down counter being enabled to count down and thereby change said variable delay in the opposite direction in response to detection of a data transition on the other side of said neutral zone.

5. A synchronizing circuit comprising a data input terminal for connection with an input data stream, a sample clock input terminal for connection with clock means providing a sample clock signal of predetermined frequency establishing a predetermined sample clock period, and a data output terminal, said circuit comprising;

programmable delay circuit means connected with said input terminal and providing a first delayed data stream of adjustable time delay relative to said input data stream, first and second fixed time delay means serially connected with the output of said programmable delay circuit means, first and second exclusive OR gate means, connected across said first and second fixed time delay means respectively, first and second storage means for capturing and storing the output of said first and second gate means in response to an active edge of said clock signal, delay control means for controlling the delay time of said programmable delay means as a function of the state of storage means.

6. The invention defined in claim 5 wherein said first and second storage means assume a first binary state when transitions in said delayed output data stream occur outside a predetermined time interval extending equally on either side of the active edge of said sample clock signal, and one of said first and second storage means assumes a second binary state when a transition in said delayed output data stream occurs within said predetermined time interval.

7. The invention defined in claim 6 wherein said delay control means is an up/down counter which is enabled when either of said first and second storage means assume said second binary state and whose counting direction is dependent on which one of said storage means assumes said second binary state.

* * * * *